Patented July 26, 1938

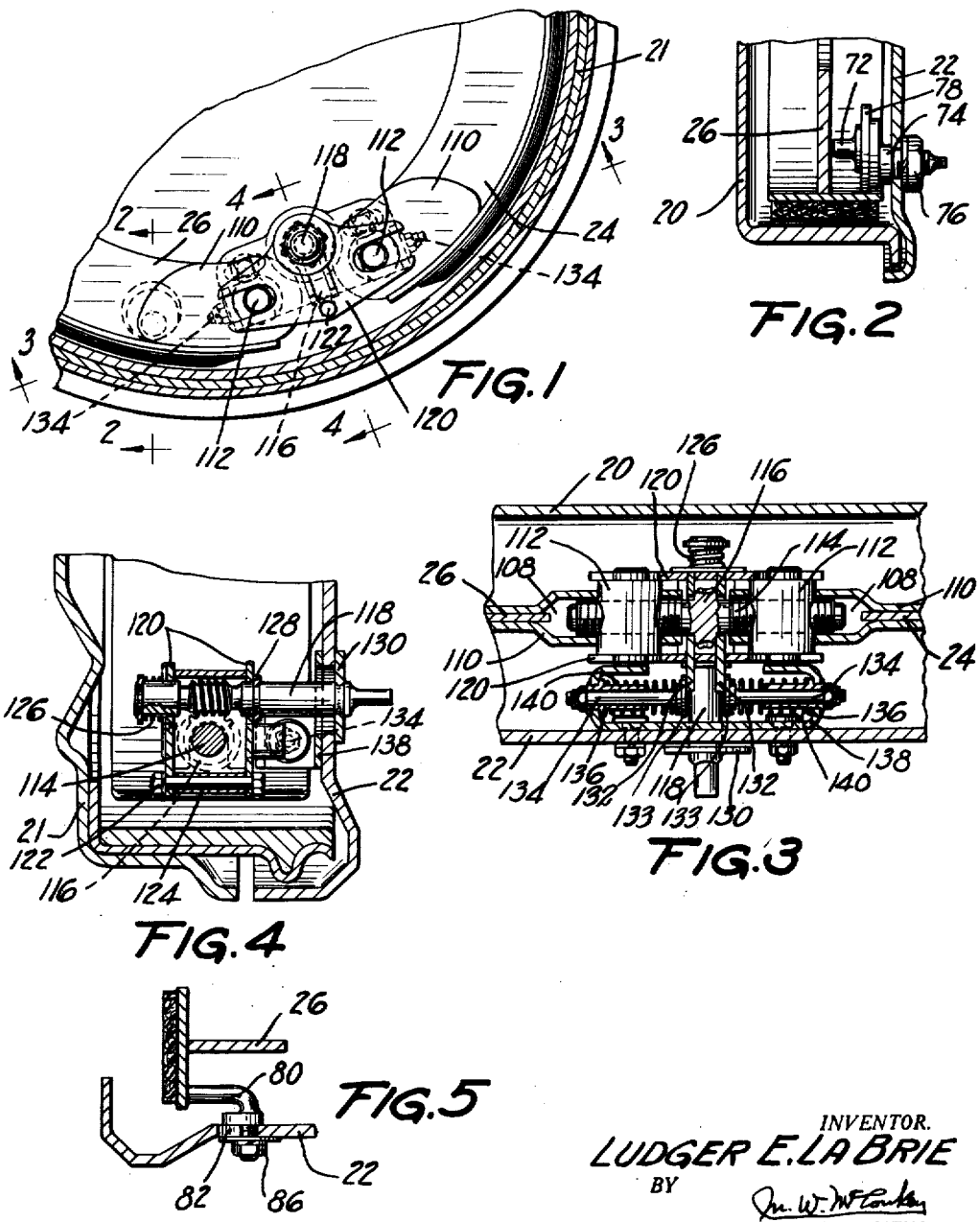

2,124,786

UNITED STATES PATENT OFFICE

2,124,786

BRAKE

Ludger E. La Brie, Detroit, Mich., assignor to Bendix Aviation Corporation, South Bend, Ind., a corporation of Delaware Original application September 12, 1935, Serial No. 40,291. Patent No. 2,102,852, dated December 21, 1937. Divided and this application May 5, 1937, Serial No. 140,898

2 Claims. (Cl. 188—79.5)

This invention relates to brakes, and is illustrated as embodied in internal expanding automobile brakes of the shiftable anchorage type.

An object of the invention is to provide novel and improved positioning means for the brake shoes or their equivalents. This means is intended to be carried by the backing plate of the brake, and preferably includes centering springs acting on a laterally projecting part carried by the shoes, and which is shown as part of an adjustment connecting the shoes.

Other objects and features, including various novel combinations of parts and desirable particular constructions, will be apparent from the following description of the illustrative embodiments shown in the accompanying drawing, in which:

Figure 1 is a partial vertical section through the brake, just inside the head of the brake drum, with the brake shoes shown in side elevation;

Figure 2 is a partial section on the line 2—2 of Figure 1, showing an eccentric stop for one of the shoes;

Figure 3 is a partial section on the line 3—3 of Figure 1, showing the adjusting and centering means;

Figure 4 is a partial section through said means on the line 4—4 of Figure 1; and Figure 5 is a section showing an alternative form of stop for the shoe.

The brake shown in Figure 1 includes a rotatable pressed drum 20 (or the lined drum 21 shown in section in Figure 4, and described and claimed in my Patent No. 2,507,725, granted October 20, 1936), at the open side of which is arranged a support such as a stamped steel backing plate 22, and within which is arranged the friction means of the brake. The illustrated friction means includes a pair of floating shoes 24 and 26 of T section, each having a central stiffening web and a cylindrical outer rim faced with brake lining.

The brake is applied by means, and has an anchorage, shown and claimed in my Patent No. 2,044,990, granted June 23, 1936, of which my application No. 40,291 was a partial continuation. The present application is a division of said application No. 40,291.

In the brake illustrated, the shoes have at their lower ends sockets 108 formed by registering grooves in stampings 110 spotwelded or otherwise secured to the webs of the shoes. Stampings 110 also carry transverse pivots 112 having central threaded openings adjustably receiving oppositely-extending right-and-left threaded stems formed on an adjusting member 114.

Member 114 is shown centrally formed with a worm wheel 116 meshing with and driven by a worm formed on a cross shaft 118, floating with the above-described adjustable joint, and the end of which extends outside the backing plate and is there formed to be grasped by a wrench. Shaft 118 is journaled in two end plates 120, slotted to be mounted on the reduced-diameter ends of the pivots 112 and held by a clamp bolt 122 (Figure 4) and spacer sleeve 124 mounted thereon between the end plates.

Shaft 118 is yieldingly held in place by a spring 126, confined between the outer end plate 120 and a snap-ring in the end of the shaft, the spring urging the shaft upwardly in Figure 4 until a snap-ring 128 carried by the shaft engages the second end plate 120. The shaft 118 also carries a washer 130 covering an enlarged opening in the backing plate through which the shaft projects.

The end plates 120 are also formed with openings receiving lugs formed on two washers 132 mounted on the adjusting member 114 on opposite sides of the worm wheel 116. Two lugs on these washers project some distance through the end plate, toward the backing plate 22, and form part of a novel spring centering device. These lugs 132 project between, and are engaged by enlarged collars 133 on the ends of, stems or plungers 134 slidably mounted in guide sleeves 136.

Sleeves 136 are fixed in oppositely-facing sockets formed in a stamping 138 bolted or otherwise fixedly mounted on the backing plate. Plungers 134 are encircled by coil springs 140 confined between the collars on the adjacent ends of the plungers, and the bases of the sockets in the stamping 138. Springs 140 are compressed sufficiently so that, whenever the brake is released, they will act through plungers 134 on the lugs 132 to center the shoes.

Shoe 26 is shown positioned in part by a web-engaging extension 72 on an eccentric 74 adjustable from outside the backing plate locked by nut 76 and carrying a rim-engaging roller 78. Alternatively the shoe rim could be engaged by the end of a right-angle stop 80 (Figure 5) adjustably clamped in a slot 82 by means such as a nut 86.

While one illustrative embodiment has been described in detail, it is not my intention to limit the scope of my invention to that particular embodiment, or otherwise than by the terms of the appended claims.

I claim:

1. A brake comprising friction members having an adjustable connection therebetween, spaced washers having laterally-projecting parts forming part of said connection, a device fixedly mounted opposite the connection and provided with oppositely-facing sockets between which said parts are arranged, and spring-pressed plungers in said sockets and acting on said parts to center the brake.

2. A brake centering device comprising a stamping formed with aligned sockets facing toward each other, guide sleeves fixed in the outer ends of said sockets, plungers slidably arranged in the sleeves and formed with collars at their adjacent ends, and coil springs sleeved on the plungers and sleeves and confined between the collars and the outer ends of the sockets.

LUDGER E. LA BRIE.

CERTIFICATE OF CORRECTION.

Patent No. 2,124,786.     July 26, 1938.

LUDGER E. LA BRIE.

It is hereby certified that error appears in the printed specification of the above numbered patent requiring correction as follows: Page 1, first column, line 34, for the patent number "2,507,725" read 2,057,725; and that the said Letters Patent should be read with this correction therein that the same may conform to the record of the case in the Patent Office.

Signed and sealed this 15th day of August, A. D. 1939.

Leslie Frazer
Acting Commissioner of Patents.

(Seal)

ing part of said connection, a device fixedly mounted opposite the connection and provided with oppositely-facing sockets between which said parts are arranged, and spring-pressed plungers in said sockets and acting on said parts to center the brake.

2. A brake centering device comprising a stamping formed with aligned sockets facing toward each other, guide sleeves fixed in the outer ends of said sockets, plungers slidably arranged in the sleeves and formed with collars at their adjacent ends, and coil springs sleeved on the plungers and sleeves and confined between the collars and the outer ends of the sockets.

LUDGER E. LA BRIE.

CERTIFICATE OF CORRECTION.

Patent No. 2,124,786.     July 26, 1938.

LUDGER E. LA BRIE.

It is hereby certified that error appears in the printed specification of the above numbered patent requiring correction as follows: Page 1, first column, line 34, for the patent number "2,507,725" read 2,057,725; and that the said Letters Patent should be read with this correction therein that the same may conform to the record of the case in the Patent Office.

Signed and sealed this 15th day of August, A. D. 1939.

Leslie Frazer
Acting Commissioner of Patents.

(Seal)